United States Patent
Li et al.

(10) Patent No.: US 12,026,037 B2
(45) Date of Patent: Jul. 2, 2024

(54) INFORMATION RECORDING METHOD, APPARATUS, AND DEVICE, AND READABLE STORAGE MEDIUM

(71) Applicant: INSPUR ELECTRONIC INFORMATION INDUSTRY CO., LTD., Shandong (CN)

(72) Inventors: Zhenhui Li, Shandong (CN); Rui Hao, Shandong (CN); Yanwei Wang, Shandong (CN)

(73) Assignee: INSPUR ELECTRONIC INFORMATION INDUSTRY CO., LTD., Shandong (CN)

(*) Notice: Subject to any disclaimer, the term of this patent is extended or adjusted under 35 U.S.C. 154(b) by 0 days.

(21) Appl. No.: 18/011,378

(22) PCT Filed: Feb. 19, 2021

(86) PCT No.: PCT/CN2021/076949
§ 371 (c)(1),
(2) Date: Dec. 19, 2022

(87) PCT Pub. No.: WO2021/253855
PCT Pub. Date: Dec. 23, 2021

(65) Prior Publication Data
US 2023/0214286 A1 Jul. 6, 2023

(30) Foreign Application Priority Data
Jun. 19, 2020 (CN) .......................... 202010568683.6

(51) Int. Cl.
*G06F 11/00* (2006.01)
*G06F 11/07* (2006.01)
*G06F 13/16* (2006.01)

(52) U.S. Cl.
CPC ........ *G06F 11/073* (2013.01); *G06F 11/0766* (2013.01); *G06F 13/1673* (2013.01); *G06F 2213/0026* (2013.01)

(58) Field of Classification Search
CPC .......................... G06F 11/073; G06F 11/0766
See application file for complete search history.

(56) References Cited

U.S. PATENT DOCUMENTS 10,474,518 B1 * 11/2019 Rupavatharam ...... G06F 11/366
2009/0193298 A1 7/2009 Mukherjee
(Continued)

FOREIGN PATENT DOCUMENTS

| CN | 101471823 A | 7/2009 |
| CN | 104077220 A | 10/2014 |

(Continued)

OTHER PUBLICATIONS

International search report for PCT/CN2021/076949 dated May 17, 2021.
(Continued)

*Primary Examiner* — Joshua P Lottich
(74) *Attorney, Agent, or Firm* — Dennemeyer & Associates LLC; Victoria Friedman

(57) ABSTRACT

An information recording method, apparatus, and device, and a readable storage medium are provided. The method includes: when a server is started, determining a ring buffer in a Double Data Rate (DDR) of a Field-Programmable Gate Array (FPGA) acceleration card based on an OpenPower platform; determining a start address and an end address of the ring buffer and configuring the start address and the end address to the FPGA acceleration card; and during a running process of the server, recording preset debugging information to the ring buffer in real time, so as to perform fault location according to data in the ring buffer after a fault (Continued)

occurs in the server. According to the present application, during a running process of a server, preset debugging information is recorded using a DDR of an FPGA acceleration card.

20 Claims, 2 Drawing Sheets

(56) References Cited

U.S. PATENT DOCUMENTS

| | | | | |
|---|---|---|---|---|
| 2015/0033082 A1* | 1/2015 | Shirlen | ............... | G06F 11/0724 710/306 |
| 2015/0242293 A1* | 8/2015 | Segger | ................ | G06F 11/3476 714/33 |
| 2016/0292057 A1* | 10/2016 | Segger | .................... | G06F 11/26 |
| 2016/0344629 A1* | 11/2016 | Gray | ..................... | H04L 49/106 |
| 2020/0218635 A1* | 7/2020 | Komanduri | ......... | G06F 11/3612 |

FOREIGN PATENT DOCUMENTS

| | | |
|---|---|---|
| CN | 105204977 A | 12/2015 |
| CN | 106227651 A | 12/2016 |
| CN | 106462601 A | 2/2017 |
| CN | 106598800 A | 4/2017 |
| CN | 107957958 A | 4/2018 |
| CN | 108628726 A | 10/2018 |
| CN | 111858116 A | 10/2020 |

OTHER PUBLICATIONS

Chinese application first office action and search report for 202010568683.6 filed on Jun. 19, 2020.

* cited by examiner

INFORMATION RECORDING METHOD, APPARATUS, AND DEVICE, AND READABLE STORAGE MEDIUM

CROSS-REFERENCE TO RELATED APPLICATIONS

This is a 35 U.S.C. 371 National Stage Patent Application of International Application No. PCT/CN2021/076949, filed Feb. 19, 2021, which claims priority to Chinese application 202010568683.6, filed Jun. 19, 2020, each of which is hereby incorporated by reference in its entirety.

TECHNICAL FIELD

The present disclosure relates to the technical field of computers, in particular to an information recording method, apparatus, and device, and a readable storage medium.

BACKGROUND

At present, when testing accelerated processing of data in a server by a Field-Programmable Gate Array (FPGA) acceleration card based on an OpenPower platform, a server down fault will occur. Generally, a kdump service in the server captures debugging-related information, so that after the server fault, a technician may analyze the information for fault location. However, if the down fault causes a Central Processing Unit (CPU) error of the server, the kdump service will not function properly and will not capture the related information.

Therefore, how to capture the debugging-related information when the server fault causes the CPU error is a problem to be solved by those skilled in the art.

SUMMARY

In view of this, the purpose of the present application is to provide an information recording method, apparatus, and device, and a readable storage medium, so as to capture debugging-related information when a server fault causes a CPU error. The specific solutions are as follows.

In a first aspect, an embodiment of the present application provides an information recording method, which may include the following operations.

If a server is started, a ring buffer is determined in a Double Data Rate (DDR) of an FPGA acceleration card based on an OpenPower platform, the FPGA acceleration card being in communication connection with the server.

A start address and an end address of the ring buffer are determined, and the start address and the end address are configured to the FPGA acceleration card.

During a running process of the server, preset debugging information is recorded to the ring buffer in real time, so as to perform fault location according to data in the ring buffer after a fault occurs in the server.

In an embodiment, the operation of determining a ring buffer in a DDR of an FPGA acceleration card based on an OpenPower platform may include the following operation.

The size of a storage space of the DDR is read, the size of a buffer memory space of the ring buffer is calculated according to a preset proportion, and the ring buffer is allocated in the DDR according to the size of the buffer memory space.

In an embodiment, after the start address and the end address are configured to the FPGA acceleration card, the method may further include the following operation.

After the FPGA accelerator initializes the current data write address of the ring buffer, the ring buffer is mapped to the server through Peripheral Component Interconnect Express (PCIE).

In an embodiment, the operation of recording preset debugging information to the ring buffer in real time may include the following operation.

The preset debugging information is recorded to the ring buffer in real time in the form of an American Standard Code for Information Interchange (ASCII), and the current data write address is controlled to be updated accordingly.

In an embodiment, after the current data write address is controlled to be updated accordingly, the method may further include the following operation.

If the ring buffer overflows, a backup operation or a reset operation is performed on the ring buffer according to preset configuration information.

In an embodiment, the operation of performing a backup operation on the ring buffer may include the following operation.

A backup storage area is determined in the DDR, and data in the ring buffer is backed up to the backup storage area.

In an embodiment, the step of performing fault location according to data in the ring buffer may include the following operations.

An address of the ring buffer or the backup storage area is mapped to a virtual address through a map function.

Data in the ring buffer or the backup storage area is read through the virtual address, and the data is written into a log.txt file, so as to view the character string data type through vim.

In a second aspect, an embodiment of the present application provides an information recording apparatus, which may include: a determination module, a configuration module and a recording module.

The determination module may be configured to determine, if a server is started, a ring buffer in a DDR of an FPGA acceleration card based on an OpenPower platform, the FPGA acceleration card being in communication connection with the server.

The configuration module may be configured to determine a start address and an end address of the ring buffer, and configure the start address and the end address to the FPGA acceleration card.

The recording module may be configured to record, during a running process of the server, preset debugging information to the ring buffer in real time, so as to perform fault location according to data in the ring buffer after a fault occurs in the server.

In a third aspect, an embodiment of the present application provides an information recording device, which may include a memory and a processor.

The memory may be configured to store a computer program.

The processor may be configured to execute the computer program to implement the foregoing disclosed information recording method.

In a fourth aspect, an embodiment of the present application provides a readable storage medium, configured to store a computer program. Herein, the computer program, when executed by a processor, implements the foregoing disclosed information recording method.

According to the above solutions, the present application provides the information recording method, which may include that: if the server is started, the ring buffer is determined in the DDR of the FPGA acceleration card based on the OpenPower platform, the FPGA acceleration card being in communication connection with the server; the start address and the end address of the ring buffer are determined, and the start address and the end address are configured to the FPGA acceleration card; and during the running process of the server, the preset debugging information is recorded to the ring buffer in real time, so as to perform fault location according to the data in the ring buffer after the fault occurs in the server.

It can be seen that in the present application, after the server is started, the ring buffer is firstly arranged in the DDR of the FPGA acceleration card, so that the preset debugging information may be recorded to the ring buffer in real time during the running process of the server, and then after the fault occurs in the server, a technician may perform fault location according to the data in the ring buffer. According to the present application, during the running process of the server, the preset debugging information is recorded using the DDR of the FPGA acceleration card; therefore, when a down fault causes a CPU error of the server, recording of the debugging information may also be ensured, thereby facilitating fault location, and also extending the function of the FPGA acceleration card and improving the usability of the FPGA acceleration card.

Accordingly, the information recording apparatus, and device, and the readable storage medium provided in the present application also have the above-mentioned technical effects.

BRIEF DESCRIPTION OF THE DRAWINGS

In order to more clearly illustrate the embodiments of the present application or the technical solutions in the related art, the drawings used in the description of the embodiments or the related art will be briefly described below. It is apparent that the drawings described below are only the embodiments of the present application. Other drawings may further be obtained by those of ordinary skill in the art according to these drawings without creative efforts.

DETAILED DESCRIPTION OF THE EMBODIMENTS

The technical solutions in the embodiments of the present application will be clearly and completely described below in combination with the drawings in the embodiments of the present application. It is apparent that the described embodiments are not all embodiments but only part of embodiments of the present application. All other embodiments obtained by those of ordinary skill in the art on the basis of the embodiments in the present application without creative work shall fall within the scope of protection of the present application.

At present, when testing accelerated processing of data in a server by an FPGA acceleration card based on an OpenPower platform, if a down fault occurs and causes a CPU error of the server, debugging-related information may not be captured. Therefore, the present application provides an information recording solution, which may ensure recording of the debugging information when the down fault causes the CPU error of the server.

Figure 1:
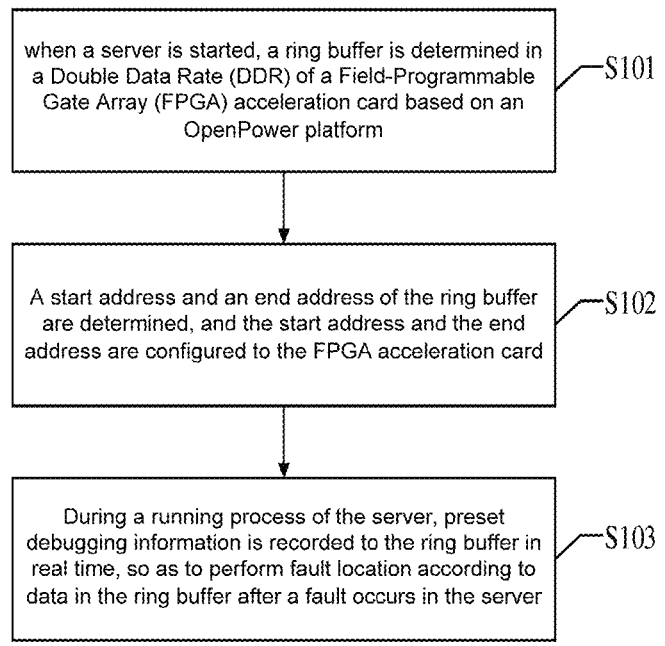
FIG. 1 is a flowchart of an information recording method disclosed in an embodiment of the present application.

Referring to FIG. 1, the embodiments of the present application disclose an information recording method, which includes the following operations.

At S101, if a server is started, a ring buffer is determined in a DDR of an FPGA acceleration card based on an OpenPower platform.

Figure 2:
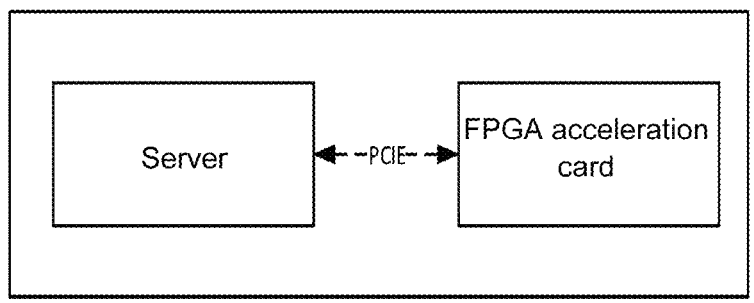
FIG. 2 is a connection architecture diagram of an FPGA acceleration card and a server disclosed in an embodiment of the present application.

Herein, the FPGA acceleration card is in communication connection with the server based on PCIE, and a connection architecture is as shown in FIG. 2. If the server is started, the FPGA acceleration card may be subjected to power-on self-test and transfer the size of a storage space of the DDR therein to the server through a bar address register, so that the server may determine the size of the storage space of the DDR by reading the bar address register, and allocate the ring buffer.

In an embodiment, the operation of determining a ring buffer in a DDR of an FPGA acceleration card based on an OpenPower platform includes that: the size of the storage space of the DDR is read, the size of a buffer memory space of the ring buffer is calculated according to a preset proportion, and the ring buffer is allocated in the DDR according to the size of the buffer memory space. The preset proportion is, for example, 1% of the size of the storage space of DDR. The ring buffer may default to a maximum of 16M and a minimum of 1M.

It is to be noted that, since the OpenPower platform is not well adapted to the FPGA acceleration card, when testing the accelerated processing of the data in the server by the FPGA acceleration card based on the OpenPower platform, the down fault will occur. The down fault may cause the CPU error of the server, and since a kdump service in the server needs the support of the CPU of the server to complete the collection of relevant core information, when the CPU error of the server occurs, the kdump service may not collect debugging information related to a test. The server may be a Linux server. Herein, the OpenPower platform is a platform for Linux server tuning, which is built on open industry standards.

At S102, a start address and an end address of the ring buffer are determined, and the start address and the end address are configured to the FPGA acceleration card.

In an embodiment, after the start address and the end address are configured to the FPGA acceleration card, the method further includes that: after the FPGA accelerator initializes the current data write address of the ring buffer, the ring buffer is mapped to the server through PCIE. Herein, the current data write address of the ring buffer is initialized, so that the current data write address may be the same as the start address of the ring buffer, and no data is recorded in the ring buffer at this time.

At S103, during a running process of the server, preset debugging information is recorded to the ring buffer in real time, so as to perform fault location according to data in the ring buffer after a fault occurs in the server.

In an embodiment, the operation of recording preset debugging information to the ring buffer in real time includes that: the preset debugging information is recorded to the ring buffer in real time in the form of an ASCII, and the current data write address is controlled to be updated accordingly.

After each recording of the data in the ring buffer, the current data write address is updated accordingly. If after the current data write address is controlled to be updated accordingly, the ring buffer overflows (that is, the ring buffer is fully written), a backup operation or a reset operation is performed on the ring buffer according to the preset configuration information. Herein, if the ring buffer overflows, it indicates that the current data write address is the same as the end address of the ring buffer, or the current data write address has exceeded the end address of the ring buffer. Herein, due to the ring buffer, when the current data write address exceeds the end address of the ring buffer, essentially the data currently written into the ring buffer overwrites data previously recorded in the ring buffer, which may cause data loss.

In order to avoid data loss, the backup operation may be performed on the ring buffer, and the backup operation specifically includes that: a backup storage area (that is, a newly divided storage area) is determined in the DDR, and data in the ring buffer is backed up to the backup storage area, so that the reset operation may be directly performed on the ring buffer subsequently, that is, new data is directly written in an overwritten manner. At this time, since the original data has been backed up to the backup storage area, data loss may not be caused.

Of course, if the data in the ring buffer may be discarded when the ring buffer overflows, the reset operation is directly performed on the ring buffer, and there is no need to do backup work for the data. Herein, when the ring buffer overflows, a user may preset whether to directly perform the reset operation or the backup operation on the ring buffer in the preset configuration information.

In an embodiment, the step of performing fault location according to data in the ring buffer includes that: an address of the ring buffer or the backup storage area is mapped to a virtual address through a map function; and data in the ring buffer or the backup storage area is read through the virtual address, and the data is written into a log.txt file, so as to view the character string data type through vim. Herein, since the preset debugging information is recorded to the ring buffer in the form of the ASCII, the character string data type may be directly viewed through the vim, which may provide convenience for a technician.

It can be seen that in the embodiment of the present application, after the server is started, the ring buffer is firstly arranged in the DDR of the FPGA acceleration card, so that the preset debugging information may be recorded to the ring buffer in real time during the running process of the server, and then after the fault occurs in the server, the technician may perform fault location according to the data in the ring buffer. According to the embodiment, during the running process of the server, the preset debugging information is recorded using the DDR of the FPGA acceleration card; therefore, when the down fault causes the CPU error of the server, recording of the debugging information may also be ensured, thereby facilitating fault location, and also extending the function of the FPGA acceleration card and improving the usability of the FPGA acceleration card.

In order to more clearly illustrate the technical solutions of the present application, the following will be described in detail.

After the server is started, the FPGA acceleration card is subjected to power-on self-test, and at the same time, confirms the size of the storage space of the DDR of the FPGA acceleration card and transfers the size of the storage space to the server through the bar address register. After loading a driver, the server reads the bar address register to confirm the size of the storage space of the DDR and then allocates 1% of the size of the storage space of the DDR as the ring buffer. Then, the start address and the end address of the ring buffer are configured to the FPGA acceleration card, and after the FPGA acceleration card initializes the data address register (that is, the current data write address) of the ring buffer, this segment of the storage space of the ring buffer is mapped to the server through the bar address space of the PCIE.

During the running process of the server, the preset debugging information is written into the ring buffer in real time in the form of the ASCII using a printk function in the driver, and if a register interrupt processing function in the driver determines that the ring buffer overflows, the FPGA acceleration card generates a Message Signaled Interrupt (MSI) of the PCIE to notify the server, so that the server determines whether to perform the backup operation or the reset operation on the ring buffer according to specific requirements. If the backup operation is performed on the ring buffer, a storage area is determined in the DDR again for backing up the data in the current ring buffer. The preset debugging information may be preset by the user to select which information is recorded during the test.

If the fault occurs in the server, the driver maps the ring buffer and the backup storage area to a user-state program through a remmap interface of a char device node for displaying the data therein. At an application layer, an application finds the corresponding driver through a/dev/fpga device node, and determines the virtual addresses of the ring buffer and the backup storage area through map function mapping. The data therein is read by the virtual address, and written into the log. txt file in the form of file writing. Since the data is written into the storage area in the form of the ASCII, the character string data type may be directly viewed through vim, so that the technician may view and use the character string data type conveniently.

It can be seen from the above that the embodiment may autonomously configure the sizes of the ring buffer and the backup storage area, may also ensure the recording of the debugging information when the down fault causes the CPU error of the server, may provide effective debugging information, and may also improve the function of the FPGA acceleration card and reduce the hardware resource requirements.

An information recording apparatus provided by the embodiments of the present application is described below, and the information recording apparatus described below and the information recording method described above may be cross-referenced.

Figure 3:
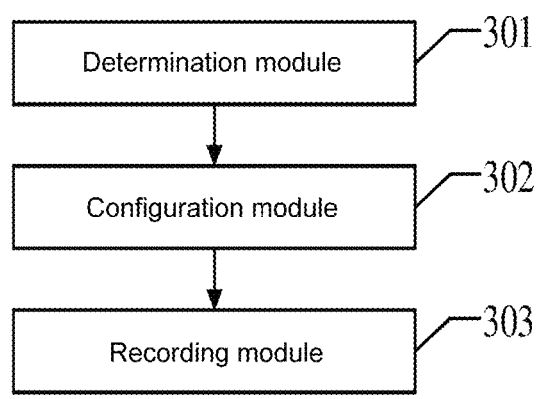
FIG. 3 is a schematic diagram of an information recording apparatus disclosed in an embodiment of the present application.

Referring to FIG. 3, the embodiments of the present application disclose an information recording apparatus, which includes: a determination module 301, a configuration module 302 and a recording module 303.

The determination module 301 is configured to determine, if a server is started, a ring buffer in a DDR of an FPGA acceleration card based on an OpenPower platform, the FPGA acceleration card being in communication connection with the server.

The configuration module 302 is configured to determine a start address and an end address of the ring buffer, and configure the start address and the end address to the FPGA acceleration card.

The recording module 303 is configured to record, during a running process of the server, preset debugging information to the ring buffer in real time, so as to perform fault location according to data in the ring buffer after a fault occurs in the server.

In an embodiment, the module is specifically configured to:
  read the size of the storage space of the DDR, calculate the size of a buffer memory space of the ring buffer according to a preset proportion, and allocate the ring buffer in the DDR according to the size of the buffer memory space.

In an embodiment, the FPGA acceleration card is specifically configured to:
  map the ring buffer to the server through PCIE after the current data write address of the ring buffer is initialized.

In an embodiment, the recording module is specifically configured to:
  record the preset debugging information to the ring buffer in real time in the form of an ASCII, and control the current data write address to be updated accordingly.

In an embodiment, the information recording apparatus further includes an execution module.

The execution module is configured to perform, if the ring buffer overflows, a backup operation or a reset operation on the ring buffer according to preset configuration information.

In an embodiment, the execution module is specifically configured to:
  determine a backup storage area in the DDR, and back up data in the ring buffer to the backup storage area.

In an embodiment, the recording module is specifically configured to:
  map an address of the ring buffer or the backup storage area to a virtual address through a map function; and
  read data in the ring buffer or the backup storage area by the virtual address, and write the data into a log. txt file, so as to view the character string data type through vim.

Herein, the more specific working process of each module and unit in the embodiment may refer to the corresponding contents disclosed in the foregoing embodiments, which will not be elaborated here.

It can be seen that the embodiments provide the information recording apparatus, during the running process of the server, the apparatus records the preset debugging information using the DDR of the FPGA acceleration card; therefore, when the down fault causes the CPU error of the server, the recording of the debugging information may also be ensured, thereby facilitating fault location, and also extending the function of the FPGA acceleration card and improving the usability of the FPGA acceleration card.

An information recording device provided by the embodiments of the present application is described below, and the information recording device described below and the information recording method and apparatus described above may be cross-referenced.

Figure 4:
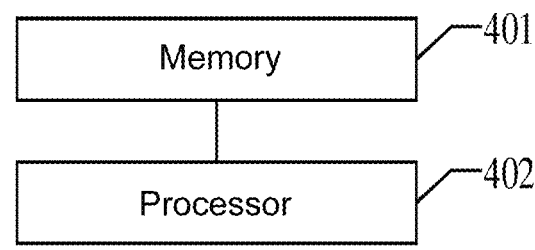
FIG. 4 is a schematic diagram of an information recording device disclosed in an embodiment of the present application.

Referring to FIG. 4, the embodiments of the present application disclose an information recording device, which includes: a memory 401 and a processor 402.

The memory 401 is configured to store a computer program.

The processor 402 is configured to execute the computer program to implement the method disclosed in any of the above-mentioned embodiments.

A readable storage medium provided by the embodiments of the present application is described below, and the readable storage medium described below and the information recording method, apparatus and device described above may be cross-referenced.

A readable storage medium is configured to store a computer program. Herein, the computer program, when executed by a processor, implements the information recording method disclosed in the foregoing embodiment. The specific steps of the method may refer to the corresponding contents disclosed in the foregoing embodiments, which will not be elaborated here.

The terms "first", "second", "third", "fourth", and the like (if exists) involved in the present application are only used to distinguish similar objects, and are not necessarily used to describe a specific order or sequence. It should be understood that the data used in this way are interchangeable under appropriate circumstances, so that the embodiments described herein may be implemented in an order other than those illustrated or described herein. In addition, terms "include" and "have" and any transformations thereof are intended to cover nonexclusive inclusions. For example, a process, method or device including a series of steps or units is not limited to the steps or units which are clearly listed but may include other steps or units intrinsic to the processes, the methods, or the devices.

It is to be noted that, "first", "second", and the like involved in the present application are used for descriptive purposes only, and cannot be understood as indicating or implying relative importance or implicitly indicating the number of indicated technical features. Therefore, the features defined with "first" and "second" may explicitly or implicitly include at least one of the features. In addition, the technical solutions between the various embodiments may be combined with each other, but must be realized by those of ordinary skill in the art, and when the combination of the technical solutions is contradictory or may not be realized, it should be considered that the combination of the technical solutions does not exist and is not within the scope of protection claimed in the present application.

The various embodiments in the present specification are described in a progressive manner, and each embodiment focuses on differences from other embodiments, and the same or similar parts between the various embodiments can be referred to each other.

The steps of the method or algorithm described in combination with the embodiments disclosed herein may be implemented directly by hardware, a software module executed by a processor, or a combination of the two. The software module may be placed in a Random Access Memory (RAM), a memory, a Read Only Memory (ROM), an electrically programmable ROM, an electrically erasable programmable ROM, a register, a hard disk, a removable disk, a Compact Disc (CD)-ROM, or any other form of readable storage medium known in the technical field.

The principles and implementation modes of the present application are described herein using specific examples, the foregoing description of the examples are only used to help the understanding of the method and core concept of the present application. At the same time, for those of ordinary skill in the art, according to the concept of the present application, there will be changes in the specific implementation modes and the application scope. In summary, the contents of the present description should not be construed as limiting the present application.

What is claimed is:

1. An information recording method, comprising:
  when a server is started, determining a ring buffer in a Double Data Rate (DDR) of a Field-Programmable Gate Array (FPGA) acceleration card based on an OpenPower platform, the FPGA acceleration card being in communication connection with the server;

determining a start address and an end address of the ring buffer, and configuring the start address and the end address to the FPGA acceleration card; and during a running process of the server, recording preset debugging information to the ring buffer in real time, so as to perform fault location according to data in the ring buffer after a fault occurs in the server.

2. The information recording method according to claim 1, wherein the step of determining a ring buffer in a DDR of an FPGA acceleration card based on an OpenPower platform comprises:

reading a size of a storage space of the DDR, calculating a size of a buffer memory space of the ring buffer according to a preset proportion, and allocating the ring buffer in the DDR according to the size of the buffer memory space.

3. The information recording method according to claim 1, wherein after the start address and the end address are configured to the FPGA acceleration card, the method further comprises:

after the FPGA accelerator initializes the current data write address of the ring buffer, mapping the ring buffer to the server through Peripheral Component Interconnect express (PCIe).

4. The information recording method according to claim 3, wherein the recording preset debugging information to the ring buffer in real time comprises:

recording the preset debugging information to the ring buffer in real time in the form of an American Standard Code for Information Interchange (ASCII), and controlling the current data write address to be updated accordingly.

5. The information recording method according to claim 4, wherein after the current data write address is controlled to be updated accordingly, the method further comprises:

when the ring buffer overflows, performing a backup operation or a reset operation on the ring buffer according to preset configuration information.

6. The information recording method according to claim 5, wherein the performing a backup operation on the ring buffer comprises:

determining a backup storage area in the DDR, and backing up data in the ring buffer to the backup storage area.

7. The information recording method according to claim 6, wherein the performing fault location according to data in the ring buffer comprises:

mapping an address of the ring buffer or the backup storage area to a virtual address through a map function; and reading data in the ring buffer or the backup storage area through the virtual address, and writing the data into a log.txt file, so as to view the character string data type through vim.

8. The information recording method according to claim 7, the method further comprises:

when a fault occurs in the server, the driver maps the ring buffer and the backup storage area to a user-state program through a remmap interface of a char device node for displaying the data.

9. The information recording method according to claim 5, the method further comprises:

presetting whether to perform the reset operation or the backup operation on the ring buffer in preset configuration information.

10. The information recording method according to claim 1, the method further comprises:

after the server is started, the FPGA acceleration card is subjected to power-on self-test, and at the same time, confirms the size of the storage space of the DDR of the FPGA acceleration card and transfers the size of the storage space to the server through the bar address register;

after loading a driver, the server reads the bar address register to confirm the size of the storage space of the DDR.

11. The information recording method according to claim 1, the method further comprises:

when a register interrupt processing function in the driver determines that the ring buffer overflows, the FPGA acceleration card generates a Message Signaled Interrupt (MSI) of the PCIE to notify the server, so that the server determines whether to perform the backup operation or the reset operation on the ring buffer according to specific requirements.

12. The information recording method according to claim 1, wherein the FPGA acceleration card is in communication connection with the server based on Peripheral Component Interconnect express (PCIe).

13. An information recording device, comprising:
a memory, configured to store a computer program; and
a processor, configured to execute the computer program to:

when a server is started, determine a ring buffer in a Double Data Rate (DDR) of a Field-Programmable Gate Array (FPGA) acceleration card based on an OpenPower platform, the FPGA acceleration card being in communication connection with the server;

determine a start address and an end address of the ring buffer, and configure the start address and the end address to the FPGA acceleration card; and during a running process of the server, record preset debugging information to the ring buffer in real time, so as to perform fault location according to data in the ring buffer after a fault occurs in the server.

14. The information recording device according to claim 13, wherein the processor is further configured to execute the computer program to:

read a size of a storage space of the DDR, calculating a size of a buffer memory space of the ring buffer according to a preset proportion, and allocating the ring buffer in the DDR according to the size of the buffer memory space.

15. The information recording device according to claim 13, wherein the processor is further configured to execute the computer program to:

after the FPGA accelerator initializes the current data write address of the ring buffer, map the ring buffer to the server through Peripheral Component Interconnect express (PCIe).

16. The information recording device according to claim 15, wherein the processor is further configured to execute the computer program to:

record the preset debugging information to the ring buffer in real time in the form of an American Standard Code for Information Interchange (ASCII), and controlling the current data write address to be updated accordingly.

17. The information recording device according to claim 16, wherein the processor is further configured to execute the computer program to:

when the ring buffer overflows, perform a backup operation or a reset operation on the ring buffer according to preset configuration information.

18. The information recording device according to claim 17, wherein the processor is further configured to execute the computer program to:

determine a backup storage area in the DDR, and backing up data in the ring buffer to the backup storage area.

19. The information recording device according to claim 18, wherein the processor is further configured to execute the computer program to:

map an address of the ring buffer or the backup storage area to a virtual address through a map function; and read data in the ring buffer or the backup storage area through the virtual address, and write the data into a log.txt file, so as to view the character string data type through vim.

20. A non-transitory readable storage medium, storing a computer program, when the computer program is executed by a processor, cause the processor to:

when a server is started, determine a ring buffer in a Double Data Rate (DDR) of a Field-Programmable Gate Array (FPGA) acceleration card based on an OpenPower platform, the FPGA acceleration card being in communication connection with the server;

determine a start address and an end address of the ring buffer, and configure the start address and the end address to the FPGA acceleration card; and during a running process of the server, record preset debugging information to the ring buffer in real time, so as to perform fault location according to data in the ring buffer after a fault occurs in the server.

* * * * *